(12) United States Patent
Samuels et al.

(10) Patent No.: US 8,063,149 B2
(45) Date of Patent: *Nov. 22, 2011

(54) FLUOROCOPOLYMERS BLENDS

(75) Inventors: George J Samuels, Williamsville, NY (US); Gregory J Shafer, Newark, DE (US)

(73) Assignee: Honeywell International Inc., Morristown, NJ (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/960,232

(22) Filed: Dec. 19, 2007

(65) Prior Publication Data

US 2008/0153977 A1   Jun. 26, 2008

Related U.S. Application Data

(60) Provisional application No. 60/870,988, filed on Dec. 20, 2006.

(51) Int. Cl.
C08L 27/12 (2006.01)
C08L 33/04 (2006.01)

(52) U.S. Cl. ......... 525/199; 525/191; 525/222; 525/227

(58) Field of Classification Search .................. 525/191, 525/199, 209, 221, 222, 227, 231; 526/242, 526/250, 255
See application file for complete search history.

(56) References Cited

U.S. PATENT DOCUMENTS

| | | | |
|---|---|---|---|
| 2,559,640 A | 7/1951 | Kruger | |
| 2,915,510 A | 12/1959 | Hoyt | 260/87.7 |
| 2,917,497 A | 12/1959 | Honn | 260/87.5 |
| 2,919,263 A | 12/1959 | Kahrs et al. | |
| 2,931,840 A | 4/1960 | Marquis | |
| 2,970,988 A | 2/1961 | Lo | |
| 2,975,164 A | 3/1961 | Crawford | 260/87.5 |
| 2,996,555 A | 8/1961 | Rausch | |
| 3,053,818 A | 9/1962 | Honn et al. | |
| 3,085,996 A | 4/1963 | Lo | |
| 3,240,757 A | 3/1966 | Sterling | |
| 3,240,825 A | 3/1966 | Hauptschein et al. | |
| 3,324,069 A | 6/1967 | Koblitz et al. | |
| 3,716,599 A | 2/1973 | Vasta | 260/859 |
| 3,812,066 A | 5/1974 | Stone et al. | |
| 3,847,881 A | 11/1974 | Mueller et al. | 260/80.77 |
| 3,893,987 A | 7/1975 | Chandrasekaran | 260/80.77 |
| 4,105,716 A | 8/1978 | Sakai et al. | |
| 4,125,700 A | 11/1978 | Graham | |
| 4,151,225 A | 4/1979 | Buning | |
| 4,308,359 A | 12/1981 | Büning | 525/276 |
| 4,622,364 A | 11/1986 | Ohmori et al. | |
| 4,696,989 A | 9/1987 | Oka et al. | |
| 4,925,907 A * | 5/1990 | Miyabayashi et al. | 526/255 |
| 4,990,406 A | 2/1991 | Kappler et al. | 428/422 |
| 5,030,394 A | 7/1991 | Sietses et al. | 264/28 |
| 5,051,345 A | 9/1991 | Haraga et al. | 430/505 |
| 5,200,480 A | 4/1993 | Maruyama et al. | 526/249 |
| 5,292,816 A | 3/1994 | Metz et al. | 525/276 |
| 5,496,889 A | 3/1996 | Schlund et al. | 525/166 |
| 5,726,268 A | 3/1998 | Sakamoto | |
| 6,342,569 B1 | 1/2002 | Manzoni et al. | 526/249 |
| 6,362,271 B1 | 3/2002 | Lin et al. | 524/520 |
| 6,486,281 B1 | 11/2002 | Kitada et al. | 526/264 |
| 6,548,719 B1 | 4/2003 | Nair et al. | 570/157 |
| 6,703,450 B2 | 3/2004 | Bauerle et al. | 525/326.3 |
| 6,703,465 B2 | 3/2004 | Funaki et al. | |
| 6,867,273 B2 | 3/2005 | Lannuzel et al. | 526/250 |
| 2003/0236353 A1 * | 12/2003 | Rajagopalan | 525/199 |
| 2004/0210017 A1 * | 10/2004 | Rajagopalan | 526/242 |
| 2004/0236018 A1 * | 11/2004 | Rajagopalan et al. | 525/55 |

OTHER PUBLICATIONS

Crivello et al.; "*Transition Metal-Catalyzed Tandem Isomerization and Cationic Polymerization of Allyl Ethers. I. Discovery and Scope*"; J Polymer Sci A: Polym. Chem; (1997) 35; pp. 1593-1604.

* cited by examiner

*Primary Examiner* — Irina S Zemel
*Assistant Examiner* — Jeffrey Lenihan

(57) ABSTRACT

A polymer blend including: (i) a fluoroolefin polymer prepared by a process, including contacting in a first reaction zone an initiator, 2,3,3,3-tetrafluoro-1-propene, and optionally, at least one first ethylenically unsaturated comonomer capable of copolymerizing therewith, wherein contacting is carried out at a first temperature, pressure and length of time sufficient to produce the fluoroolefin polymer; and (ii) an acrylic polymer prepared by a process, including contacting in a second reaction zone an initiator, at least one acrylic monomer selected from the group consisting of: acrylic acid, methacrylic acid, acrylate ester, methacrylate ester, and a mixture thereof, and optionally, at least one second ethylenically unsaturated comonomer capable of copolymerizing therewith, wherein contacting is carried out at a second temperature, pressure and length of time sufficient to produce the acrylic polymer. Processes for preparing the polymer blends are also provided.

11 Claims, No Drawings

FLUOROCOPOLYMERS BLENDS

CROSS-REFERENCE TO A RELATED APPLICATION

The present application claims priority from U.S. Provisional Patent Application No. 60/870,988, filed Dec. 20, 2006, which is incorporated herein by reference.

BACKGROUND OF THE INVENTION

1. Field of the Invention

The present invention generally relates to a blend of 2,3,3,3-tetrafluoro-1-propene ($CF_3CF=CH_2$) homopolymer, copolymer, or terpolymer with a comonomer capable of copolymerizing therewith, with a homopolymer, copolymer, or a terpolymer of acrylate or methacrylate ester with a comonomer capable of copolymerizing therewith. More particularly, the present invention relates to a fluoroolefin of 2,3,3,3-tetrafluoropropene ($CF_3CF=CH_2$) copolymer blend with a polyacrylate ester and/or a polymethacrylate ester.

2. Description of the Prior Art

Fluorine-containing monomers, polymers and copolymers are described in U.S. Pat. Nos. 2,970,988, 2,931,840, 2996,555, 3,085,996, 6,486,281, 6,867,273 (see Column 3, line 29-50) and 6,703,450 (see Column 2, line 42, to Column 3, line 5, for monomers). Vinylidene fluoride copolymers are described in U.S. Pat. No. 3,893,987 (see Example 2) and process is described in U.S. Pat. No. 3,240,757. VDF/CTFE copolymers are described in U.S. Pat. Nos. 5,292,816 and 3,053,818 (see Example 6).

Other copolymers made from fluoroolefins are described in U.S. Pat. Nos. 3,812,066; 2,599,640; 6,342,569; 5,200,480; and 2,919,263.

Fluorocarbon/Acrylate Coatings are described in U.S. Pat. No. 3,716,599 and powder coating are described in U.S. Pat. No. 5,030,394.

Solvent based blending is described in U.S. Pat. No. 3,324,069. Polyvinylidene fluoride/polymethyl methacrylate blends are described in U.S. Pat. No. 6,362,271. Other blends are described in U.S. Pat. Nos. 5,051,345; 5,496,889 (Compatibilized Blends); 4,990,406 (F-terpolymer/acrylate blends). Graft Copolymers are described in U.S. Pat. No. 4,308,359.

Use of fluoro monomers as stress relievers is described in U.S. Pat. No. 3,847,881. 2-chloropentafluoropropene is described in U.S. Pat. Nos. 2,915,510 (see Example 4); 2,917,497 (see Example 11); and 2,975,164 (see Example 7).

However, none of these references describes preparation of blends of homopolymers, copolymers, terpolymers employing 2,3,3,3-tetrafluoropropene ($CF_3CF=CH_2$) with acrylic polymers.

In view of the high cost of the fluoro polymers, there is a need in industry to develop a general and commercially feasible process for making such fluorine-containing polymer blends and exploring their properties and uses in various applications.

To achieve this objective, the present invention provides a practical process for making these polymers and exploring their properties and uses in various applications, including applications as sealants, gaskets, tubing, elastomers, waterproofing, and thermoplastic, thermoset and powder coatings.

For this reason, the process according to the present invention is potentially useful commercially.

SUMMARY OF THE INVENTION

The present invention provides homopolymers and copolymers, terpolymers employing 2,3,3,3-tetrafluoro-1-propene as well as blends of these homopolymers, copolymers, and terpolymers of 2,3,3,3-tetrafluoro-1-propene ($CF_3CF=CH_2$) with and the blends thereof with acrylic polymers.

The polymer blend comprises:

a fluoroolefin polymer prepared by a process, comprising the step of contacting in a first reaction zone an initiator, 2,3,3,3-tetrafluoro-1-propene ($CF_3CF=CH_2$), and optionally, at least one first ethylenically unsaturated comonomer capable of copolymerizing therewith, wherein said contacting is carried out at a first temperature, pressure and length of time sufficient to produce said fluoroolefin polymer; and an acrylic polymer prepared by a process, comprising the step of contacting in a second reaction zone an initiator, at least one acrylic monomer selected from the group consisting of: acrylic acid, methacrylic acid, acrylate ester, methacrylate ester, and a mixture thereof, and optionally, at least one second ethylenically unsaturated comonomer capable of copolymerizing therewith, wherein said contacting is carried out at a second temperature, pressure and length of time sufficient to produce said acrylic polymer.

The homopolymers, copolymers, and terpolymers of 2,3,3,3-tetrafluoro-1-propene ($CF_3CF=CH_2$) and the blends thereof with acrylic polymers have higher glass transition temperatures (Tg) relative to vinylidene fluoride polymers and, as such, they have lower surface energy and produce coatings that have higher toughness, which result in superior performance in coatings.

These and other benefits of the present invention will become more evident from detailed description of the preferred embodiments that follow.

DETAILED DESCRIPTION OF THE PREFERRED EMBODIMENTS

The present invention provides a polymer blend comprising:

a fluoroolefin polymer prepared by a process, comprising the step of contacting in a first reaction zone an initiator, 2,3,3,3-tetrafluoro-1-propene ($CF_3CF=CH_2$), and optionally, at least one first ethylenically unsaturated comonomer capable of copolymerizing therewith, wherein said contacting is carried out at a first temperature, pressure and length of time sufficient to produce said fluoroolefin polymer; and an acrylic polymer prepared by a process, comprising the step of contacting in a second reaction zone an initiator, at least one acrylic monomer selected from the group consisting of: acrylic acid, methacrylic acid, acrylate ester, methacrylate ester, and a mixture thereof, and optionally, at least one second ethylenically unsaturated comonomer capable of copolymerizing therewith, wherein said contacting is carried out at a second temperature, pressure and length of time sufficient to produce said acrylic polymer.

Preferably, the polymer blend has from about 50 wt % to about 99.9 wt % of said fluoroolefin polymer; and from about 0.1 wt % to about 50 wt % of said acrylic polymer.

More preferably, the polymer blend has from about 70 wt % to about 95 wt % of said fluoroolefin polymer; and from about 5 wt % to about 30 wt % of said acrylic polymer.

Most preferably, the polymer blend has from about 85 wt % to about 95 wt % of said fluoroolefin polymer; and from about 5 wt % to about 15 wt % of said acrylic polymer.

Preferably, fluoroolefin polymer of the polymer blend is selected from a 2,3,3,3-tetrafluoro-1-propene homopolymer, copolymer, terpolymer, and a mixture thereof, and the acrylic polymer is selected from an acrylic homopolymer, copolymer, terpolymer, and a mixture thereof.

The first ethylenically unsaturated comonomer is selected from α-trifluoromethylacrylate, α-trifluoromethylacrylonitrile, a fluoroolefin comonomer represented by the formula:

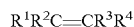

$R^1R^2C=CR^3R^4$ wherein each of $R^1$, $R^2$, $R^3$, and $R^4$ is independently selected from the group consisting of: hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of 1-6 carbon atoms optionally substituted by at least one fluorine, with the proviso that at least one of the $R^1$, $R^2$, $R^3$, and $R^4$ groups is either fluorine or a fluorine-containing group, and a mixture thereof.

The fluoroolefin comonomer is selected from $CFH=CH_2$, $CF_2=CH_2$, $CF_2=CFH$, $CF_2=CF_2$, $CClF=CF_2$, $CBrF=CF_2$, $CF_3CH=CHF$, $CF_3CF=CF_2$, $CF_3CH=CF_2$, cis-$CF_3CF=CHF$, trans-$CF_3CF=CHF$, $CF_3CH=CH_2$, $CF_3CF=CH_2$, $CF_3CF_2CF=CF_2$, $CF_3CF_2CH=CF_2$, $CF_3CF_2CF=CHF$, $CF_3CF_2CH=CH_2$, $CF_3CF_2CF=CH_2$, $CF_3CF_2CF_2CF=CF_2$, $CF_3CF_2CF_2CH=CF_2$, $CF_3CF_2CF_2CF=CHF$, $CF_3CF_2CF_2CH=CH_2$, $CF_3CF_2CF_2CF=CH_2$, $CF_3CH=CHCF_3$, $CF_3CH=CFCF_3$, $CF_3CF=CFCF_3$, $HOCH_2CH=CHF$, $HOCH_2CH=CF_2$, $HOCH_2CF=CH_2$, $HOCH_2CF=CHF$, $HOCH_2CF=CF_2$, $HOCH_2CF=CH_2$, $CF_3CH=CHCl$, $CF_3CCl=CH_2$, $CF_3CCl=CHF$, $CF_3CCl=CF_2$, $CF_3CF=CHCl$, $CF_3CH=CFCl$, $(CF_3)_2C=CH_2$, $CF_3CF_2CF_2CH=CH_2$, $CF_3CF_2CF_2OCF=CF_2$, $CF_3CF_2CF_2CH=CH_2$, $CF_3OCF=CF_2$, and a mixture thereof.

Preferably, the 2,3,3,3-tetrafluoro-1-propene is from about 20 wt % to 100 wt % of the total weight of the fluoroolefin polymer. More preferably, the 2,3,3,3-tetrafluoro-1-propene is from about 50 wt % to 100 wt % of the total weight of the fluoroolefin polymer. Most preferably, the 2,3,3,3-tetrafluoro-1-propene is from about 70 wt % to 100 wt % of the total weight of the fluoroolefin polymer.

Preferably, the first ethylenically unsaturated comonomer is up to about 80 wt % of the total weight of the fluoroolefin polymer. More preferably, the first ethylenically unsaturated comonomer is up to about 50 wt % of the total weight of the fluoroolefin polymer. Most preferably, the first ethylenically unsaturated comonomer is up to about 30 wt % of the total weight of the fluoroolefin polymer.

The at least one acrylic monomer is preferably an acrylate or methacrylate ester of 4 to 24 carbon atoms. The acrylate or methacrylate ester is selected from methyl acrylate, ethyl acrylate, propyl acrylate, butyl acrylate, ethylhexylacrylate, octyl acrylate, dodecyl acrylate, stearyl acrylate, benzyl acrylate, phenyl acrylate, methylmethacrylate, ethylmethacrylate, butylmethacrylate, ethylhexylmethacrylate, hydroxyethyl acrylate, hydroxyethyl methacrylate, hydroxypropyl acrylate, hydroxypropyl methacrylate, glycidyl acrylate, glycidyl methacrylate, and a mixture thereof.

The second ethylenically unsaturated comonomer is selected from alkene of 2-8 carbon atoms, acrylonitrile, methacrylonitrile, vinyl ether, styrene, alpha-methylstyrene, paramethyl styrene, allyl alcohol, methallyl alcohol, vinyl acetate, vinyl carboxylate of 5-24 carbon atoms, methyl ethyl ketone, hydroxyethyl vinyl ether, hydroxybutyl vinyl ether, and alkyl vinyl ether.

The second ethylenically unsaturated comonomer can further include a fluorine-containing comonomer, such as, a perfluoroalkyl vinyl ether, $CFH=CH_2$, $CF_2=CH_2$, $CF_2=CFH$, $CF_2=CF_2$, $CClF=CF_2$, $CBrF=CF_2$, $CF_3CH=CHF$, $CF_3CF=CF_2$, $CF_3CH=CF_2$, cis-$CF_3CF=CHF$, trans-$CF_3CF=CHF$, $CF_3CH=CH_2$, $CF_3CF=CH_2$, $CF_3CF_2CF=CF_2$, $CF_3CF_2CH=CF_2$, $CF_3CF_2CF=CHF$, $CF_3CF_2CH=CH_2$, $CF_3CF_2CF=CH_2$, $CF_3CF_2CF_2CF=CF_2$, $CF_3CF_2CF_2CH=CF_2$, $CF_3CF_2CF_2CF=CHF$, $CF_3CF_2CF_2CH=CH_2$, $CF_3CF_2CF_2CH=CH_2$, $CF_3CH=CHCF_3$, $CF_3CH=CFCF_3$, $CF_3CF=CFCF_3$, $HOCH_2CH=CHF$, $HOCH_2CH=CF_2$, $HOCH_2CF=CH_2$, $HOCH_2CF=CHF$, $HOCH_2CF=CF_2$, $HOCH_2CF=CH_2$, $CF_3CH=CHCl$, $CF_3CCl=CH_2$, $CF_3CCl=CHF$, $CF_3CCl=CF_2$, $CF_3CF=CHCl$, $CF_3CH=CFCl$, $(CF_3)_2C=CH_2$, $CF_3CF_2CF_2CH=CH_2$, $CF_3CF_2CF_2OCF=CF_2$, $CF_3CF_2CF_2CH=CH_2$, $CF_3OCF=CF_2$, and a mixture thereof.

Preferably, the second ethylenically unsaturated comonomer is up to about 30 wt % of the total weight of the acrylic polymer.

The step of contacting is typically carried out at a temperature, pressure and length of time sufficient to produce the desired fluoroolefin polymer.

The first contacting is preferably carried out at a temperature from about 10° C. to about 80° C., a pressure from about 450 kPa (4.4 atm) to about 2412 kPa (23.8 atm), and length of time from about 30 minutes to about 48 hours. The first contacting is preferably carried out at a temperature from about 20° C. to about 70° C., a pressure from about 586 kPa (5.8 atm) to about 1792 kPa (17.7 atm), and length of time from about 6 hours to about 48 hours. The pressures mentioned are for the 2,3,3,3 tetrafluoro-1-propene monomer. The pressure will change as the comonomer is charged reflecting the autogenous pressure of the system. For example if pure vinylidene fluoride is polymerized at a temperature between 35° C. and 100° C., and the initial pressures will be about 5500 kPa (54.3 atm) to 20000 kPa. (198 atm). Of course, it is possible during polymerization to increase the productivity of the reactor by injecting further amounts of vinylidene fluoride or of water or by raising the polymerization temperature.

When the 2,3,3,3 tetrafluoro-1-propene monomer is copolymerized with vinylidene fluoride, the monomers are dispersed within water and the resultant monomer droplets are subjected to polymerization in the presence of a polymerization initiator. Due to its more rapid polymerization small amounts of vinylidene fluoride can be continuously feed into the reactor reducing the total pressure of the system so that it is similar to that of 2,3,3,3,tetrafluoro-1-propene. It is also possible to start the suspension polymerization at a temperature below 30.1° C. (the critical temperature of vinylidene fluoride) and then continue the polymerization by raising the temperature after formation of the particles. Suspension polymerization allows easier post-processing of the resultant polymer The suspension polymer or copolymer is mixed with an acrylate such as methyl methacrylate or methyl or ethyl acrylate or blends of acrylates and methacrylates and heated from about 20° C. to about 60° C. for about 30 minutes to about 4 hours to prepare a blend of polyacrylate and fluoropolymer. Further additions of initiator can also be made.

Similarly, emulsion polymerization of the fluoromonomers can be can also be conducted followed by the addition of the desired acrylate monomers for a second stage of polymerization The 2,3,3,3-tetrafluoropropene ($CF_3CF=CH_2$) monomer and the ethylenically unsaturated comonomers can either be premixed and advantageously introduced as a single feed into the reaction zone, or they can be introduced as separate feeds into the reaction zone in such a ratio that the desired composition is obtained.

The 2,3,3,3-tetrafluoropropene ($CF_3CF=CH_2$) monomer starting material is known in the art and is generally available from commercial sources. Others can be prepared by known methods described in the chemical literature.

For example, $CF_3CH=CHF$ can be made in large scale from commercially available $CF_3CH_2CF_2H$ according to methods described in U.S. Pat. No. 6,548,719 B1. $CF_3CH_2CF_2H$ is produced by and is available from Honeywell International, Inc., Morristown, N.J.

Preferably, $CF_3CH=CF_2$ is formed from $CF_3CH_2CF_2H$ by chlorination followed by dehydrochlorination and $CF_3CH=CHF$ is formed from $CF_3CH_2CF_2H$ by dehydrofluorination.

Another aspect of the process of the invention is use of selected free-radical initiators. Common initiators used for free radical polymerization of unsaturated monomers are generally satisfactory in the process of the invention depending on the nature and properties desired. For example, azo-type initiators result in high polydispersity in the molecular weight distribution whereas perester type peroxides produce a narrow molecular weight distribution and, as such, are preferably used in most cases.

Examples of the initiator include azobiscyanoacrylates, aliphatic peresters, such as, t-butyl peroctoate and t-amyl peroctoate, aliphatic peroxides, such as, tert-butyl peroxide, aliphatic hydroperoxides, such as, tert-butyl hydroperoxide, a persulfate, such as potassium persulfate, and a mixture thereof. The persulfate initiator, which is preferred for solution, emulsion and suspension polymerizations, is selected from sodium persulfate, potassium persulfate, ammonium persulfate, iron persulfate, and a mixture thereof.

Generally, the perester initiator is used at a concentration of less than 20 weight percent based on the weight of the total monomers, usually the perester initiator is used at concentrations less than 12 weight percent, with a range of from 0.1 to 1.0 weight percent being preferred.

Preferably, the perester initiator is added to the reaction zone together with the monomeric reactants, as previously stated. However, a minor amount of peroxide as a finishing step may be added after the polymerization reaction has substantially ended. Such a finishing step has the purpose of removing minor amounts of unreacted monomers and aids in achieving a reaction zone product that may be used directly for the desired end use or application.

Thus, it is important that at least 50, and preferably at least 80, weight percent of the peroxide to be added with the monomers and the balance of the initiator added at substantially the conclusion of the polymerization reaction.

The polymerization process is advantageously conducted in the presence of tertiary amine or a tertiary mercaptan-type chain transfer agent. Tertiary mercaptans are preferred chain transfer agents in the practice of the invention. Failure to use a chain transfer agent will result in use of very high levels of perester initiator or yield a copolymer of too high molecular weight to have the required high organic solvent solubility.

Generally, the chain transfer agent is used at a concentration of less than 5 weight percent based on the weight of monomers added to the reaction zone.

The reaction zone preferably has provision for agitation and heat exchange to assist uniformity and process control.

The process can be carried out as a continuous, batch, vapor phase, fixed bed, solution, emulsion, or a suspension type of a polymerization process.

The reaction zone can further include a diluent, such as, a solvent or mixture of solvents. Preferably, non-polar, non-reactive, non-polymerizable, non-protic solvents are used as the reaction medium. However, other solvents, such as, non-interfering non-polymerizable liquid which is a solvent both for the monomers and copolymer products of the invention. 1,1,1-trichloroethane and mixtures thereof.

In a preferred embodiment of the present process, the first and the second reaction zone further comprises a solvent selected from esters, ketones, ethers, aliphatic hydrocarbons, aromatic hydrocarbons, chlorinated hydrocarbons, ethyl acetate, butylacetate, 1-methoxy-2-propanol acetate, toluene, xylene, methyl ethyl ketone, 2-heptanone, and 1,1,1-tri-chloroethane, and mixtures thereof.

In operation, preferably at least 10 wt % of the reactants are converted to the product. More preferably, up to at least 80 wt % of the reactants are converted to the product, and most preferably, at least 90 wt % of the reactants are converted to the product.

Operation of the process of the present invention under high conversion conditions is generally preferred, particularly under batch or solution, emulsion or suspension conditions. However, for continuous, vapor phase, or fixed bed reactions, the present process provides a unique advantage of recycling of the unreacted starting materials thereby providing a cost advantage over other known processes of the prior art.

Polymerization can be carried out essentially the same way as the methods known and described in the art, such as, the methods described in *J. Polymer Sci. A: Polym. Chem.* (1997) 35, 1593-1604, and in U.S. Pat. Nos. 2,970,988; 3,893,987 (see Example 2); 3,240,757; 5,292,816; 3,053,818 (see Example 6); 3,812,066; 2,599,640; 6,342,569; 5,200,480; and 2,919,263.

Thus, the 2,3,3,3-tetrafluoropropene $(CF_3CF=CH_2)$ monomer can be readily polymerized to form homopolymers under standard polymerization conditions known to a person skilled in the art.

Alternatively, the 2,3,3,3-tetrafluoropropene $(CF_3CF=CH_2)$ monomer can be also readily polymerized to copolymers and terpolymers if one or more first ethylenically unsaturated comonomer is present. Thus, a variety of polymers, such as, homopolymers, copolymers, and terpolymers can be prepared by the process of the present invention.

Accordingly, the present invention also provides polymer blends including at least two polymers selected from homopolymers, copolymers, and terpolymers prepared by the process of the present invention.

Depending on the nature of the ethylenically unsaturated comonomers, the composition of the copolymers and terpolymers, the polymerization conditions, and the molecular weights, the polymers can be obtained as colorless liquids or transparent or white powders.

The polymer blends according to the present invention can be prepared by one of the three following processes of the present invention:

The first process includes the steps of:

dissolving at least one homopolymer, copolymer, or terpolymer of 2,3,3,3-tetrafluoro-1-propene in a first solvent to produce a first solution;

dissolving at least one acrylic polymer in a second solvent to produce a second solution;

combining first and said second solutions; and removing the solvent to produce said polymer blend.

The second is a process for preparing a polymer blend in powder form and includes the steps of:

contacting in a first reaction zone an initiator, 2,3,3,3-tetrafluoro-1-propene $(CF_3CF=CH_2)$, and optionally, at least one first ethylenically unsaturated comonomer capable of copolymerizing therewith, wherein said contacting is carried out at a first temperature, pressure and length of time sufficient to produce a fluoroolefin polymer;

precipitating said fluoroolefin polymer to obtain said fluoroolefin polymer in powder form;

contacting in a second reaction zone an initiator, at least one acrylic monomer selected from the group consisting of: acrylic acid, methacrylic acid, acrylate ester, methacrylate ester, and a mixture thereof, and optionally, at least one second ethylenically unsaturated comonomer capable of copolymerizing therewith, wherein said contacting is carried out at a second temperature, pressure and length of time sufficient to produce an acrylic polymer;

precipitating said acrylic polymer to obtain said acrylic polymer in powder form; and blending said fluoroolefin polymer in powder form with said acrylic polymer in powder form to produce said polymer blend in powder form.

The third is a process for preparing a graft core/shell polymer blend and includes the steps of:

preparing a solution, emulsion, suspension or dispersion of at least one homopolymer, copolymer, or terpolymer of 2,3,3-tetrafluoro-1-propene in a solvent to produce a solution, emulsion, suspension or dispersion;

contacting in a reaction zone:
an initiator;
said solution, emulsion, suspension or dispersion;
at least one acrylic monomer selected from the group consisting of: acrylic acid, methacrylic acid, acrylate ester, methacrylate ester, and a mixture thereof; and optionally, at least one ethylenically unsaturated comonomer capable of copolymerizing therewith;

wherein said contacting is carried out at a temperature, pressure and length of time sufficient to produce a graft core/shell polymer blend.

The above processes can further include purifying the reaction product by precipitation or chromatography to obtain the product in substantially pure form.

The polymers, copolymers and terpolymers according to the present invention are useful in a variety of applications, including preparation of barrier materials and coatings.

The following non-limiting examples are illustrative of the various embodiments of the present invention.

It is within the ability of a person of ordinary skill in the art to select other variable from amongst the many known in the art without departing from the scope of the present invention.

Accordingly, these examples shall serve to further illustrate the present invention, not to limit them. Unless otherwise indicated, all parts and percentages are on a weight basis.

EXAMPLES

Example 1

Emulsion polymerization of
2,3,3-tetrafluoro-1-propene CF3CF=CH2

A 30 mL reactor was evacuated and 15 mL of the emulsion solution (water/$Na_2HPO_4$/$NaH_2PO_4$/$FeSO_4$/$C_7F_{15}CO_2$($NH_4$)) was pumped into the autoclave via syringe.

The emulsifier solution was prepared from $FeSO_4$-ferrous sulfate: 0.005 g dissolved in buffer solution. $Na_2HPO_4$/$NaH_2PO_4$ buffer was prepare by dissolving 1.34/0.68 g 180 ml of deionized water 2.44 g or $C_7F_{15}CO_2$($NH_4$) surfactant was also dissolved in the buffer. Add 1 mL of reducing agent, $Na_2S_2O_5$-sodium metasulfite: 0.3 g dissolved in 10 mL of deoxygenated deionized water and then 1 mL of oxidizing agent ($NH_4$)$_2S_2O_8$-ammonium persulfate: 0.14 g dissolved in 10 mL of deoxygenated deionized water. The system is cooled to 0° C. and then 5 g of 2,3,3-tetrafluoro-1-propene by weight of cylinder. The reaction is kept reaction at 10° C. In the laboratory the polymerization run as a batch reaction. adding reducing or oxidizing agents as needed. The reaction is permitted to continue until the pressure drops to 1 atm Due to its higher Tg of about 48° C., the homopolymer may find use in battery separators and fuel cell membranes.

Example 2

Emulsion Copolymerization of
2,3,3,3-tetrafluoro-1-propene (1234yf) and
Vinylidene Fluoride (VDF)

A typical polymerization is run in a stirred stainless steel autoclave in which reactants are added by methods known in the art. To a 30 mL autoclave is added ($NH_4$)$_2S_2O_8$-ammonium persulfate: 0.14 g dissolved in 1.0 mL of de-$O_2$/DI water $Na_2S_2O_5$-sodium metasulfite: 0.3 g dissolved in 1.0 mL of de-$O_2$/DI water. $FeSO_4$-ferrous sulfate: 0.005 g dissolved buffer solution. $Na_2HPO_4$/$NaH_2PO_4$ buffer: 1.34/0.68 g dissolved in 180 mL. $C_7F_{15}CO_2$($NH_4$) surfactant: 2.44 g dissolved with buffer. Add 18 mL of the emulsion solution (water/$Na_2HPO_4$/$NaH_2PO_4$/$FeSO_4$/$C_7F_{15}CO_2$($NH_4$)).

During the polymerization, a mixture of the solution is stirred while 9.5 g of a mixture of 10 mol % 1234yf and 90 mol % of VDF are added in which an autogenous pressure is obtained at 10° C. The pressure is kept during the polymerization to obtain a constant concentration of monomer. After 48 hours, the polymerization is stopped and monomers are released from the autoclave. The polymerization latex was coagulated in 25% HCl and polymer was washed and dried. 2.3 grams of a white copolymer was obtained.

Due to the better thermal properties of 2,3,3,3-tetrafluoro-1-propene, its copolymers and in particular its copolymers with vinylidene fluoride may find use in battery separators and fuel cell membranes. The ratio of fluoride may be useful in controlling the flexibility of film.

Example 3

Emulsion Type Terpolymerization of
VDF/CH2=CFCF3/CF2=CFCl

A typical polymerization is run in a stirred stainless steel autoclave in which reactants are added by methods known in the art. To a 300 mL autoclave is added ($NH_4$)$_2S_2O_8$-ammonium persulfate: 22 mL of a solution of 1.12 g dissolved in 40 mL of de-$O_2$/DI water. $Na_2S_2O_5$-sodium metasulfite: 12.5 mL of a solution of 2.4 g dissolved in 40 mL of de-$O_2$/DI water. $FeSO_4$-ferrous sulfate: 0.005 g dissolved buffer solution. $Na_2HPO_4$/$NaH_2PO_4$ buffer: 1.34/0.68 g dissolved 180 mL. $C_7F_{15}CO_2$($NH_4$) surfactant: 2.44 g dissolved with buffer. Add 180 mL of the emulsion solution (water/$Na_2HPO_4$/$NaH_2PO_4$/$FeSO_4$/$C_7F_{15}CO_2$($NH_4$)).

During the polymerization, a mixture of the solution is stirred while 62.4 g of a mixture of 10.1 mol % 1234yf and 88.1 mol % of CTFE and 1.8 mol % VDF are added and an autogenous pressure is obtained at 10° C. The pressure is kept during the polymerization to obtain a constant concentration of monomer. After 6 hours, the polymerization is stopped and monomers are released from the autoclave. The polymerization latex was coagulated in 25% HCl and polymer was washed and dried. 26 grams of a white terpolymer was obtained.

Example 4

Emulsion Copolymerization of 2,3,3,3-tetrafluoro-1-propene (CF₃CF═CH₂) and HFP(CF₂═CF(CF₃))

A typical polymerization is run in a stirred stainless steel autoclave in which reactants are added by methods known in the art similar to that found in example 1, except using only ammonium persulfate as the radical source. To a 50 mL 316 SS Cylinder is added 15 mL total solution consisting of initiator solution and buffer solution.

The cylinder is then charged at −196° C. with 3.81 g mixture of 57 mol % 2,3,3,3-tetrafluoropropene and 43 mol % of HFP and the polymerization was allowed to continue at 70° C. for 30 hours. The polymerization is stopped and unreacted monomers are released from the autoclave. The polymerization latex was coagulated in 25% HCl and polymer was washed and dried. 2.0 grams of a clear elastomeric-like copolymer was obtained.

As demonstrated herein, an acrylate such as methyl methacrylate or an acrylate blend can be added to the latex and polymerized for about 2 hours at about 40° C. to give a polymer blend suitable for coatings. The blend can be easily dispersed in organic solvents such as simple acetates, methyl acetate or ethyl acetate and ketones, acetone, methyl ethyl ketone or methyl isobutyl ketone or THF or dioxane or n-methyl pyrollidinone and mixed solvents such as blends of methyl iso-butyl ketone and ethylene glycol ethyl ether acetate. One skilled in the art can choose the appropriate solvent mix to provide for a preferred combination of properties for a coating such as subsequent repair, recoating, or removal. Appropriately chosen dispersion blends can also be useful as superior coatings as described in WO 9901505. Further processing of a solvent-based coating can also produce porous membranes as described in U.S. Pat. No. 5,736,051 that are useful for biofiltration purposes.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. A polymer blend comprising:
    a fluoroolefin polymer, the fluoroolefin polymer comprising 2,3,3,3-tetrafluoro-1-propene (CF₃CF═CH₂), and optionally at least one first ethylenically unsaturated comonomer copolymerized therewith, wherein said 2,3,3,3-tetrafluoro-1-propene is from about 20 wt % to about 100 wt % of the total weight of the fluoroolefin polymer; and
    an acrylic polymer, the acrylic polymer comprising methylmethacrylate, and at least one second ethylenically unsaturated comonomer, wherein said second ethylenically unsaturated comonomer further comprises a fluorine-containing comonomer selected from the group consisting of: perfluoroalkyl vinyl ether, CFH═CH₂, CF₂═CH₂, CF₂═CFH, CF₂═CF₂, CClF═CF₂, CBrF═CF₂, CF₃CH═CHF, CF₃CF═CF₂, CF₃CH═CF₂, cis-CF₃CF═CHF, trans-CF₃CF═CHF, CF₃CH═CH₂, CF₃CF═CH₂, CF₃CF₂CF═CF₂, CF₃CF₂CH═CF₂, CF₃3CF₂CF═CHF, CF₃CF₂CH═CH₂, CF₃CF₂CF═CH₂, CF₃CF₂CF═CF₂, CF₃CF₂CF₂CH═CF₂, CF₃CF₂CF₂CF═CHF, CF₃CF₂CF₂CH═CH₂, CF₃CF₂CF₂CF═CH₂, CF₃CH═CHCF₃, CF₃CH═CFCF₃, CF₃CF═CFCF₃, HOCH₂CH═CHF, HOCH₂CH═CF₂, HOCH₂CF═CH₂, HOCH₂CF═CHF, HOCH₂CF═CF₂, HOCH₂CF═CH₂, CF₃CH═CHCl, CF₃3CCl═CH₂, CF₃CCl═CHF, CF₃CCl═CF₂, CF₃CF═CHCl, CF₃CH═CFCl, (CF₃)₂C═CH₂, CF₃CF₂CF₂CH═CH₂, CF₃CF₂CF₂OCF═CF₂, CF₃CF₂CF₂CF₂CH═CH₂, CF₃OCF═CF₂ and a mixture thereof.

2. The polymer blend of claim 1, comprising:
    from about 70 Wt % to about 95 wt % of said fluoroolefin polymer and from about 5 wt % to about 30 wt % of said acrylic polymer.

3. The polymer blend of claim 1, comprising:
    from about 85 wt % to about 95 wt % of said fluoroolefin polymer and from about 5 wt % to about 15 wt % of said acrylic polymer.

4. The polymer blend of claim 1, wherein said fluoroolefin polymer is selected from the group consisting of: a 2,3,3,3-tetrafluoro-1-propene homopolymer, copolymer, terpolymer, and a mixture thereof.

5. The polymer blend of claim 1, wherein said fluoroolefin polymer is a 2,3,3,3-tetrafluoro-1-propene copolymer.

6. The polymer blend of claim 1, wherein said first ethylenically unsaturated comonomer is selected from the group consisting of:
    α-trifluoromethylacrylate, α-trifluoromethylacrylonitrile, a fluoroolefin comonomer represented by the formula:

$R^1R^2C{=}CR^3R^4$ wherein each of $R^1$, $R^2$, $R^3$, and $R^4$ is independently selected from the group consisting of: hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of: 1-6 carbon atoms optionally substituted by at least one fluorine, with the proviso that at least one of the $R^1$, $R^2$, $R^3$, and $R^4$ groups is either fluorine or a fluorine-containing group, and a mixture thereof.

7. The polymer blend of claim 1, wherein said 2,3,3,3-tetrafluoro-1-propene is from about 50 wt % to about 100 wt % of the total weight of the fluoroolefin polymer.

8. The polymer blend of claim 1, wherein said 2,3,3,3-tetrafluoro-1-propene is from about 70 wt % to about 100 wt % of the total weight of the fluoroolefin polymer.

9. The polymer blend of claim 1, wherein said first ethylenically unsaturated comonomer is up to about 50 wt % of the total weight of the fluoroolefin polymer.

10. The polymer blend of claim 1, wherein said first ethylenically unsaturated comonomer is up to about 30 wt % of the total weight of the fluoroolefin polymer.

11. The polymer blend of claim 1, wherein said second ethylenically unsaturated comonomer is up to about 30 wt % of the total weight of the acrylic polymer.

* * * * *